Figure 1:
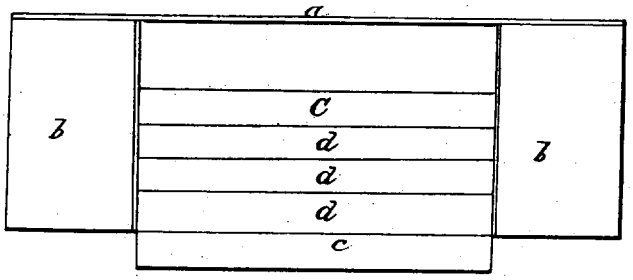
Figure 2:
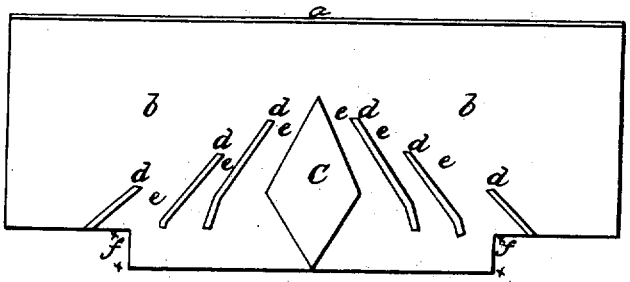
Figure 3:
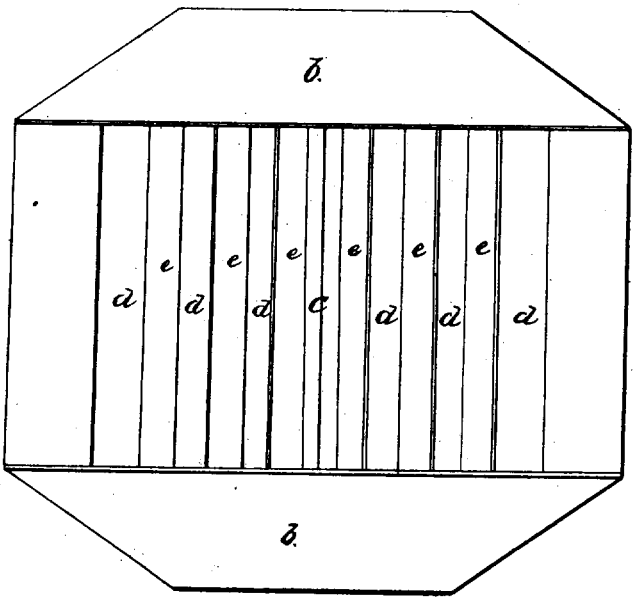

PATENTED OCT. 14, 1834.

U. B. A. LANGE.

8453X APPARATUS FOR PREVENTING CHIMNEYS FROM SMOKING.

THE NORRIS PETERS CO., PHOTO-LITHO., WASHINGTON, D. C.

Urban B. A. Lange of Philadelphia Pennsylvania

Letters Patent. 8453X

The schedule referred to in these Letters Patent and making part of the same containing a description in the words of the said Urban B. A. Lange himself of his improvement, in apparatus for preventing Chimneys from smoking.

Be it known that I Urban B. A. Lange of the City of Philadelphia in the State of Pennsylvania a foreigner residing in the said city, upwards of two years, have invented a new and useful apparatus for preventing Chimneys from smoking, and that the following is a full and exact description of the construction and operation of the said apparatus as invented by me, The apparatus consists of a frame formed of two plates of metal or sides of the form of oblong parallelograms of the same length as the sides of the chimney into which is so fixed a set of slats similar to those of venetian blinds, that when the frame is placed on the top of the chimney the slats extend entirely across the flue of the chimney parallel to each other, and sloping upwards, rise gradually from each of any two opposite sides of the chimney, towards a ridge in the centre, the whole having the shape of a roof, the upper edge of each slat over lapping the lower edge of the one immediately above it, spaces being left between each slat, as flues for the smoke to pass through. The lower slats or those resting immediately on the sides of the chimney, have their lower edges folded down over the outer edges of the respective sides of the chimney, so as to prevent any air from passing under, and having to pass over the whole thickness of the wall of the chimney before their upper edges can take their place to commence the line of gradual ascent, are proportionally broader than the others. The ridge is a body of cube shape, fixed lengthwise at each end, to one of the sides or plates and placed with one of its edges directed upwards, so that its two upper sides are in a parallel direction to the slats. This is to prevent any wind which may have passed the top or cover, to be presently mentioned, from going down the chimney.

The sides or plates rise considerably higher than the ridge and are placed upon the sides of the chimney, so as to form a continuation of the inner surface of the sides of the chimney. These sides or plates are to be supported by brick work continued up

[illegible]

8453X from the sides of the chimney. Over the whole frame is to be placed a flat top or cover, exactly fitting so as to cover the whole apparatus.

The number of the slats may be varied so as to suit the size of the chimney. I have found six to answer. The whole apparatus, slats, ridge or cube sides, and top or cover, may be made of sheet iron or other suitable material.

In uncommonly bad cases, the power of the [illegible] may be increased effectually by placing a second frame, resembling in all respects the one described, on top of the first, the top or cover being then placed only on this second frame.

The top or cover may however, in some cases be entirely omitted as when the chimney is so high, that the wind cannot blow directly down it. I would also add that in some cases it may be advisable so to fix the slats in the sides, that they may move on pivots, and be governed by a key or keys on the exterior of one of the sides passing through the brick work, so that the flues may be enlarged or diminished at pleasure by turning the slats, References to the Drawings. Fig. No. 1 the frame or complete apparatus, with the cover on and viewed from the open space between the sides along the rise of the slats, showing one side of the roof shaped arrangement a. the cover, which is placed so as to cover the frame exactly, and prevent the wind from blowing down, b.b. the two sides of the frame into which into which the ends of the slats d.d.d. are fixed, c. the cube shaped body, the upturned edge of which forms the ridge. and which is also fixed at its ends into the two sides b.b. and the shape of which tends to prevent any wind which may have passed the top or cover from going down, Fig. No. 2. A vertical section of the frame or apparatus made at right angles to the slats. a. the cover b. the remaining side c. the ridge or cube shaped body d.d.d.d.d.d. the slats e.e.e.e.e.e. the flues or passages for the smoke between the slats.

Fig. No. 3. the surface or upper face of the frame or apparatus, viewed from above after removing the top or cover b.b. the sides, the broad surface of the brick work, as well as the edge of the plate appearing c. the ridge d.d.d.d.d. the slats e.e.e.e.e.e. the flues, U. B. A. Lange Witnesses
Clement S. Miller
Joseph Bucker Drawing

1037